US009745908B2

(12) United States Patent
Lucht et al.

(10) Patent No.: US 9,745,908 B2
(45) Date of Patent: Aug. 29, 2017

(54) SYSTEM AND METHOD FOR EVALUATING OPERATING CAPABILITY OF A PRIME MOVER

(71) Applicant: THERMO KING CORPORATION, Minneapolis, MN (US)

(72) Inventors: Erich Albert Lucht, Arden Hills, MN (US); Titilope Zaburat Sule, Columbia Heights, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/655,167

(22) PCT Filed: Dec. 27, 2013

(86) PCT No.: PCT/US2013/078104
§ 371 (c)(1),
(2) Date: Jun. 24, 2015

(87) PCT Pub. No.: WO2014/106118
PCT Pub. Date: Jul. 3, 2014

(65) Prior Publication Data
US 2015/0330321 A1  Nov. 19, 2015

(51) Int. Cl.
*F02D 29/02* (2006.01)
*B60H 1/32* (2006.01)
(Continued)

(52) U.S. Cl.
CPC ......... *F02D 41/021* (2013.01); *B60H 1/3222* (2013.01); *B60H 1/3232* (2013.01);
(Continued)

(58) Field of Classification Search
CPC ..... F02D 41/021; F02D 29/02; B60H 1/3222; B60H 1/3232; B60H 2001/3266; B60H 2001/3273; B60P 3/20; G01M 17/007
(Continued)

(56) References Cited

U.S. PATENT DOCUMENTS 4,075,867 A * 2/1978 Seipp ...................... F25D 19/00
62/236
5,140,826 A   8/1992 Hanson et al.
(Continued)

FOREIGN PATENT DOCUMENTS

DE   102005042817   12/2006
EP   1038705        9/2000
(Continued)

OTHER PUBLICATIONS

International Search Report and Written Opinion for International Application No. PCT/US2013/078104, Dated Apr. 18, 2014, 9 pgs.
(Continued)

*Primary Examiner* — Hieu T Vo
(74) *Attorney, Agent, or Firm* — Hamre, Schumann, Mueller & Larson, P.C.

(57) ABSTRACT

A method of evaluating operating capability of a prime mover includes: starting the prime mover with a minimum load requirement threshold; obtaining a reference prime mover operation parameter for the prime mover; comparing the reference prime mover operation parameter with a standard prime mover operation parameter to determine a reference matrix; and adjusting via a TRS controller a standard operation threshold based on the reference matrix to obtain an optimal operation threshold.

19 Claims, 7 Drawing Sheets

(51) Int. Cl.
  *F02D 41/02* (2006.01)
  *F02D 29/06* (2006.01)
  *F02D 31/00* (2006.01)
  *B60P 3/20* (2006.01)
  *G01M 17/007* (2006.01)

(52) U.S. Cl.
  CPC ............. *F02D 29/02* (2013.01); *F02D 29/06* (2013.01); *F02D 31/007* (2013.01); *B60H 2001/3266* (2013.01); *B60H 2001/3273* (2013.01); *B60P 3/20* (2013.01); *F02D 2200/1004* (2013.01); *F02D 2200/70* (2013.01); *F02D 2400/06* (2013.01); *G01M 17/007* (2013.01)

(58) Field of Classification Search
  USPC ....... 701/101, 102, 103, 104, 105, 108, 109, 701/110, 114, 115
  See application file for complete search history.

(56) References Cited

U.S. PATENT DOCUMENTS

| | | | |
|---|---|---|---|
| 5,284,116 A * | 2/1994 | Richeson, Jr. | .......... F02B 75/02 123/406.2 |
| 5,448,479 A | 9/1995 | Kemner et al. | |
| 5,469,356 A | 11/1995 | Hawkins et al. | |
| 5,572,879 A | 11/1996 | Harrington et al. | |
| 5,630,394 A * | 5/1997 | Grizzle | ................ F02D 31/005 123/339.19 |
| 5,669,225 A | 9/1997 | Beaverson et al. | |
| 6,318,100 B1 | 11/2001 | Brendel et al. | |
| 6,543,242 B2 | 4/2003 | Reason et al. | |
| 7,054,738 B1 * | 5/2006 | Stotsky | ................. F02D 41/062 123/339.19 |
| 7,743,616 B2 | 6/2010 | Renken et al. | |
| 7,812,733 B2 | 10/2010 | Perten et al. | |
| 8,874,351 B2 * | 10/2014 | Jiang | ................... F02D 13/0215 701/103 |
| 2001/0054293 A1 | 12/2001 | Gustafson et al. | |
| 2004/0121882 A1 * | 6/2004 | Tajima | ................... B60K 6/485 477/3 |
| 2008/0087029 A1 * | 4/2008 | Renken | ................ B60H 1/3222 62/134 |
| 2009/0055091 A1 | 2/2009 | Hines et al. | |
| 2010/0168989 A1 * | 7/2010 | Gao | .................... F02D 41/2422 701/110 |
| 2011/0254690 A1 | 10/2011 | Perten et al. | |
| 2012/0234004 A1 | 9/2012 | Stoffels et al. | |
| 2012/0253636 A1 * | 10/2012 | Jiang | ................... F02D 13/0215 701/102 |
| 2013/0283826 A1 * | 10/2013 | Burnham | ................. B60K 1/00 62/56 |
| 2013/0327285 A1 * | 12/2013 | Burnham | ............... F02D 29/06 123/2 |

FOREIGN PATENT DOCUMENTS

| | | |
|---|---|---|
| EP | 2505812 | 10/2012 |
| FR | 2918712 | 1/2009 |

OTHER PUBLICATIONS

Supplementary European Search Report issued in corresponding European Application No. 13868861.9 dated Oct. 10, 2016 (12 pages).

* cited by examiner

SYSTEM AND METHOD FOR EVALUATING OPERATING CAPABILITY OF A PRIME MOVER

FIELD

The embodiments described herein relate generally to a prime mover set, and particularly, but not by way of limitation, to a system or method for evaluating operating capability of a prime mover.

BACKGROUND

Existing transport refrigeration systems are used to cool containers, trailers, and other similar transport units. Modern containers may be efficiently stacked for shipment by ship or rail. When containers are shipped by a truck, a single container is placed on a container chassis. When cargo in the container includes perishable products (e.g., food product, flowers, etc.), the temperature of the container may be controlled to limit loss of the cargo during shipment.

Some existing transport containers include a generator set that supplies power to temperature-controlling components of the transport refrigeration system. These generator sets are typically attached directly to the container or container chassis, and include a prime mover to power a generator, as well as a fuel container to supply fuel to the generator sets.

Generator sets may operate at a single, relatively constant speed to produce a constant output frequency and one or more output voltages (e.g., 230/460 VAC, etc.). These generator sets may operate at the same single speed regardless of whether the load on the transport refrigeration system is relatively high or low, and therefore may not operate at the most fuel efficient condition. During extended periods of time without inspection by transportation workers, these generator sets may use up the fuel in the fuel container. The out-of-fuel condition can cause a loss of power to the transport refrigeration system, and may result in a loss of the perishable cargo. This is especially true when ambient temperature conditions are very hot or very cold.

SUMMARY

The embodiments described herein relate generally to a prime mover set, and particularly, but not by way of limitation, to a system or method for evaluating operating capability of a prime mover.

Some transport units include a generator set to supply power to a transport refrigeration system of a transport unit, so that the transport refrigeration system can maintain a temperature inside the transport units. The transport unit usually includes a fuel container to provide fuel for a prime mover of the generator set. In particular, the embodiments described herein use initial prime mover operation parameters obtained after the prime mover is started to generate a reference matrix to help adjust optimal prime mover operation thresholds. The initial prime mover operation parameters may include: a prime mover speed (RPM), a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, a noise level, or the like.

As a result, the optimal prime mover operation thresholds help manage prime mover speed and prime mover load. Consequently, this helps reduce fuel consumption of the prime mover, and as a result, helps extend the period of time that the generator set can operate. Embodiments that reduce the fuel consumption of the prime mover can also help extend the service life of the generator set and help reduce the noise level of the generator set. Also, some embodiments described herein can help improve emission control by utilizing more accurately calculated optimal prime mover operation thresholds. Moreover, the embodiments described herein further help protect the prime mover from overloading and help to reduce engine noise.

One embodiment described herein provides a method of evaluating an operating capability of a prime mover set. The method includes starting the prime mover with a minimum load requirement threshold; obtaining a reference matrix for the prime mover; and adjusting optimal prime mover operation thresholds.

It is to be understood that the embodiments described herein may be used in any suitable transport unit such as a container unit, a ship board container, an air cargo cabin, an over the road truck cabin, etc. The embodiments may also be used in a conditioned trailer unit, railcars or other types of transport units.

It is to be understood that the present system and method is applicable also to other transport refrigeration systems that utilize an engine to drive components directly, by belt, or other transmission means.

It is to be understood that the present system and method can be used not only in transport refrigeration systems, but also in other applications, such as auxiliary power units (APU) used for air conditioning systems for driver's cabs, or portable heating, ventilating, and air conditioning (HVAC) systems, etc.

Some embodiments provide a method of evaluating operating capability of a prime mover. The method includes: starting the prime mover with a minimum load requirement threshold; obtaining a reference prime mover operation parameter for the prime mover; comparing the reference prime mover operation parameter with a standard prime mover operation parameter to determine a reference matrix; and adjusting via a TRS controller a standard operation threshold based on the reference matrix to obtain an optimal operation threshold.

In other embodiments, a load control system for a transportation refrigeration system (TRS) includes: a prime mover; and a TRS controller. The TRS controller is programmed to obtain a reference prime mover operation parameter when the prime mover is started, with a minimum load requirement threshold. The TRS controller is configured to compare the reference prime mover operation parameter with a standard prime mover operation parameter to generate a reference matrix, and is configured to use the reference matrix to adjust a standard operation threshold.

In other embodiments, a load control method by using a transport refrigeration system controller includes: instructing a prime mover of a transport refrigeration system (TRS) to start with a minimum load requirement threshold; obtaining a reference prime mover operation parameter for the prime mover; generating a reference matrix for the prime mover; and adjusting via a TRS controller a standard operation threshold based on the reference matrix.

This summary is an overview of some of the teachings of the present application and not intended to be an exclusive or exhaustive description of the claimed invention.

Further details about the present subject matter are found in the detailed description and appended claims. Other aspects of the subject matter will be apparent to persons skilled in the art upon reading and understanding the following detailed description and viewing the drawings that form a part thereof, each of which are not to be taken in a limiting sense. The scope of the claimed invention is defined by the appended claims and their equivalents.

DESCRIPTION OF THE DRAWINGS

The drawings, which are not necessarily drawn to scale, illustrate generally, by way of example, but not by way of limitation, various embodiments discussed in this application.

DETAILED DESCRIPTION

Figure 1:
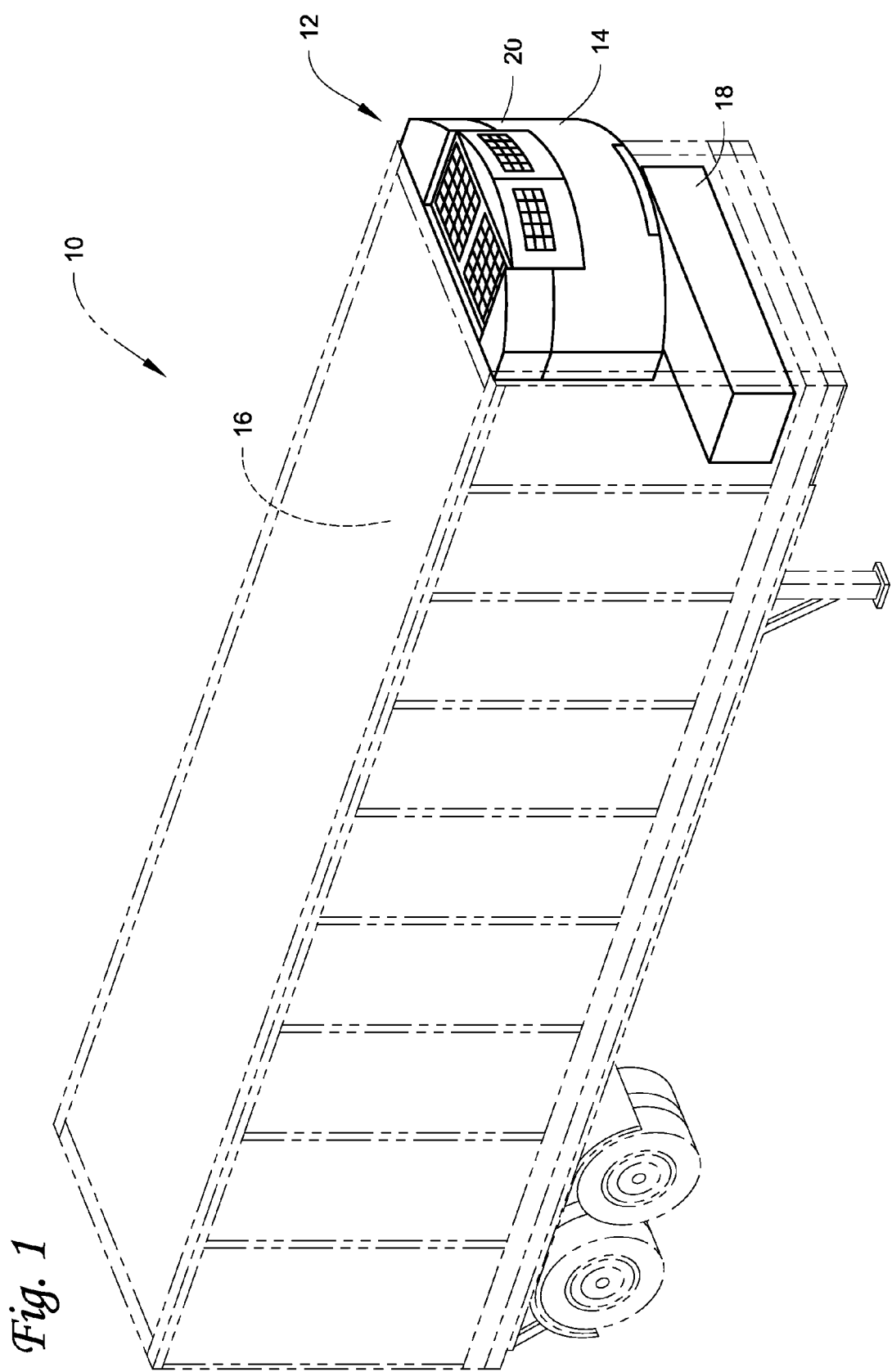
FIG. 1 is an elevated perspective view of a container unit with a transport refrigeration system.

The embodiments described herein relate generally to a prime mover set, and particularly, but not by way of limitation, to a system or method for evaluating operating capability of a prime mover.

In particular, the embodiments described herein use one or more initial prime mover operation parameters obtained after the prime mover is started to generate a reference matrix to help adjust one or more optimal prime mover operation threshold. As a result, the one or more optimal prime mover operation thresholds help manage prime mover speed and prime mover load. Consequently, this can help reduce fuel consumption, and as a result, helps extend the period of time that the generator sets can operate (i.e., improve fuel efficiency of the prime mover). Embodiments that improve fuel efficiency can also help extend the service life of the generator set and help reduce the noise level of the generator set. Also, some embodiments described herein can help improve emission and/or noise control by utilizing more accurately calculated optimal prime mover operation threshold(s) to more adequately meet emissions regulations, noise regulations and the like. Moreover, the embodiments described herein further help protect the prime mover from overloading and help reduce prime mover noise.

One embodiment described herein provides a method of evaluating operating capability of a prime mover set. The method includes starting the prime mover with a minimum load requirement threshold; obtaining a reference matrix for the prime mover; and adjusting optimal prime mover operation thresholds.

It is to be understood that the embodiments described herein may be used in any suitable transport unit such as a container unit, a ship board container, an air cargo cabin, an over the road truck cabin, etc. The embodiments may also be used in a conditioned trailer unit, railcars or other types of transport units.

In some embodiments, a generator set is provided to supply power to components, including a prime mover, of a transport refrigeration system for a transport unit. In these embodiments, the transport unit can include a fuel container to provide fuel for a prime mover of the transport refrigeration system. In other embodiments, a transport refrigeration system can be configured to drive components, including the prime mover, directly, by belt, or other transmission means without the need of a generator.

It is to be understood that the present system and method can be used not only in transport refrigeration systems, but also in other applications, such as auxiliary power units (APU) used for providing heating and cooling to a cab of a transport vehicle, or portable heating, ventilating, and air conditioning (HVAC) systems for a train or bus, etc.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that the phraseology and terminology used herein is for the purpose of description and should not be regarded as limiting.

FIG. 1 shows an elevated perspective view of a container unit 10 having a transport refrigeration system 12. A transport refrigeration unit 20 of the transport refrigeration system 12 is positioned adjacent to the front side of the container unit 10 and is enclosed in a housing 14. The transport refrigeration system 12 is in communication with a cargo space 16 and controls the temperature in the cargo space 16. The transport refrigeration unit 20 is defined by a closed refrigerant circuit (not shown). The closed refrigerant circuit regulates various conditions (e.g., temperature, humidity, etc.) of the cargo space 16, and includes a compressor coupled to a condenser and an evaporator that cools the cargo space 16 and any perishable cargo contained therein.

The transport refrigeration system 12 also has a generator set 18 that is coupled to the transport refrigeration unit 20. The generator set 18 can include a prime mover and a generator, e.g., DC generator, alternator, etc.

In one embodiment, the transport refrigeration unit 20 can be operable at multiple speeds, including at least a high frequency and a low frequency, and is defined by a closed refrigerant circuit (not shown). The closed refrigerant circuit regulates various conditions (e.g., temperature, humidity, etc.) of the cargo space 16, and can include a compressor coupled to a condenser and an evaporator that cools the cargo space 16 and the perishable cargo contained therein. In one embodiment, the prime mover of the generator set 18 can be operated at a high speed, e.g., 2200 revolutions per minute (RPMs) and a low speed, e.g., 1450 revolutions per minute (RPMs). It is to be understood that in some embodiments the transport refrigeration unit 20 can also be operated at variable speeds by utilizing a variable speed engine.

It is to be understood that the embodiments described herein are not limited to container units. The embodiments described herein may be used in any other suitable temperature controlled transport units such as a ship board container, an air cargo cabin, an over the road truck cabin, etc. The transport refrigeration system may be a vapor-compressor type transport refrigeration system, or any other suitable transport refrigeration systems that can use refrigerant, cold plate technology, etc.

Figure 2A:
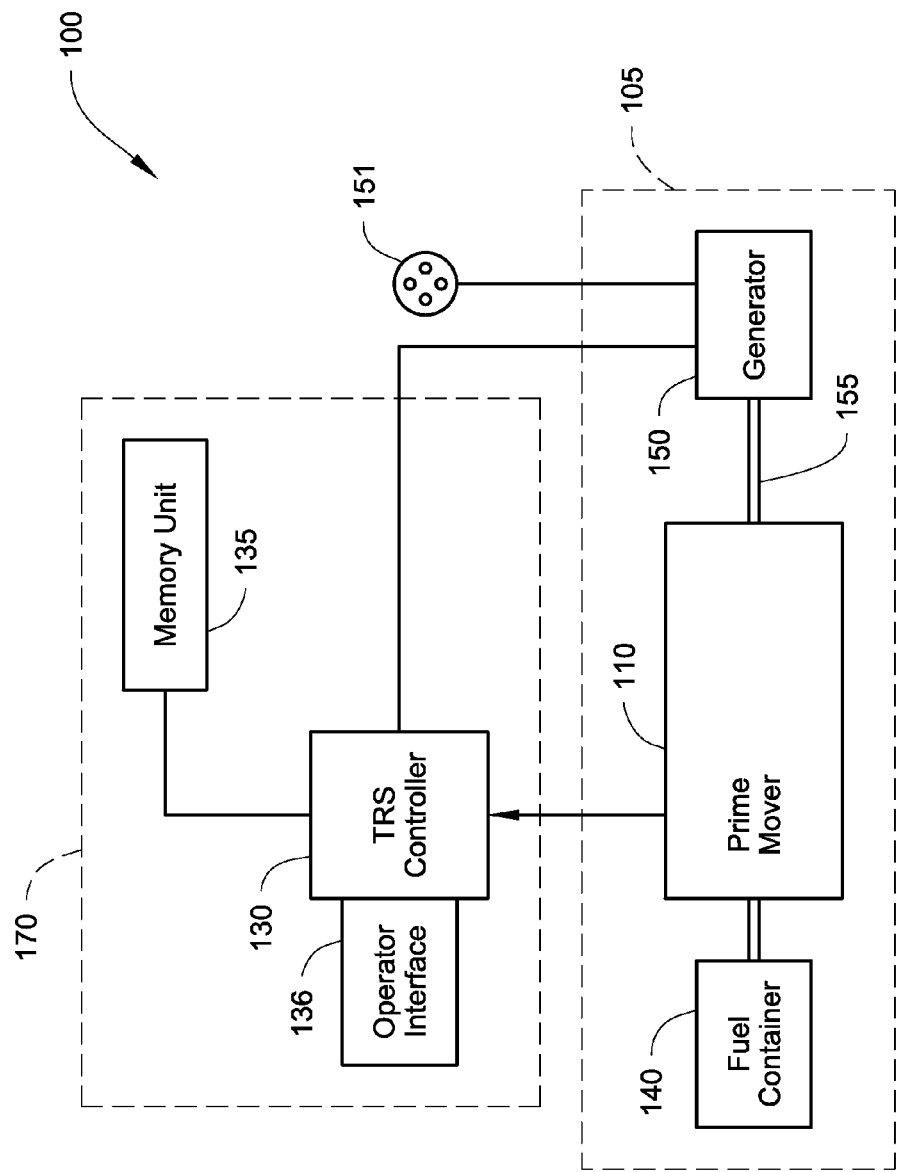
FIG. 2A is a schematic view of a mechanical generator set.

FIG. 2A illustrates a transport refrigeration system 100 including a generator set 105 and a TRS controller 130. The generator set 105 includes a prime mover 110, a generator 150 and a fuel container 140. In some embodiments, the generator set 105 can be disposed in a housing (such as the housing 14 shown in FIG. 1.).

It is to be understood that the prime mover 110 described below is a multi-speed prime mover. However, the prime mover 110 can also be a variable speed prime mover.

The illustrated prime mover 110 may be an internal combustion engine (e.g., diesel engine, etc.) that may generally include a cooling system (e.g., water or liquid coolant system), an oil lubrication system, and an electrical system (none shown). An air filtration system (not shown) filters air directed into a combustion chamber (not shown) of the prime mover 110. The prime mover 110 may also be a prime mover that is configured specifically for a transport refrigeration system. The fuel container 140 is in fluid communication with the prime mover 110 to deliver a supply of fuel to the prime mover 110.

In this embodiment, he prime mover 110 is a two speed prime mover that is controlled by the TRS controller 130. The TRS controller 130 can be configured to regulate an amount of fuel delivered to the prime mover 110 and can be configured to operate the prime mover 110 at least at a high speed and a low speed. The TRS controller 130 is configured so that the prime mover 110 can be maintained at least at either the high speed or the low speed regardless of a prime mover load on the prime mover 110. In the illustrated embodiment, the high speed can be ~2200 RPMs, and the low speed can be ~1450 RPMs. In other embodiments, the high and low speeds may be different from ~2200 RPMs and ~1450 RPMs, respectively. Also, in some embodiments, the prime mover 110 can be a variable speed prime mover that is capable of multiple different speeds between, for example, ~0 RPMs and ~1450 RPMs.

The generator 150 is coupled to the prime mover 110. The generator 150 includes a power receptacle 151 that is in electrical communication with for example the transport refrigeration unit 20 (as shown in FIG. 1) via a power cable (not shown) to provide electrical power to the transport refrigeration unit 20. In one embodiment, the generator 150 is a three-phase alternator that supplies an alternating current ("AC") to the TRU.

The generator 150 further has an output frequency that can be determined by the speed of the prime mover 110 or the field voltage of the generator 150. In some embodiments, the generator 150 is operable at a high output frequency when the prime mover 110 is operated at the high speed, and is operable at a low output frequency when the prime mover 110 is operated at the low speed. The high output frequency of the generator 150 is the same as the high frequency of the transport refrigeration unit 20. The low output frequency of the generator 150 is the same as the low frequency of the transport refrigeration unit 20.

An output voltage of the generator 150 may be determined by the output frequency. As such, the generator 150 is operable at a high output voltage in response to operation of the generator 150 at the high frequency. The generator 150 is further operable at a low output voltage in response to operation of the generator 150 at the low frequency. Thus, the speed of the prime mover 110 can determine the frequency and output voltage of the generator 150.

The generator 150 can be configured to provide a constant load capacity that is sufficient to provide power to the transport refrigeration unit 20 as shown in FIG. 1 under various loads. A load on the generator 150 corresponds to the cooling or heating demand or load on the transport refrigeration unit 20 (e.g., electrical power needed by the transport refrigeration unit 20), and is variable in response to changes in the load on the transport refrigeration unit 20.

The TRS controller 130 is configured to monitor a mover operation condition and control operation of the prime mover 110. In some embodiments, the TRS controller can monitor a mover operation in real-time. The TRS controller 130 may have a microprocessor that can communicate with an array of sensors that are configured to obtain initial prime mover operation parameters, such as a prime mover speed (RPM), a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, a noise level, etc. By analyzing the readings from the array of sensors, the TRS controller 130 can determine the operation conditions of the prime mover 110 in real time. The TRS controller 130 can be also configured to control a fuel pump so that the amount of fuel delivered to combustion chambers of the prime mover 110 can be controlled by the TRS controller 130. By regulating the amount of fuel delivered, the TRS controller 130 can be configured to maintain the prime mover 110 at a constant speed even when the load on the prime mover 110 changes. In the illustrated embodiment as shown in FIG. 2A, the TRS controller 130 is configured to maintain the prime mover 110 at least at two constant speeds, for example ~2200 RPMs and ~1450 RPMs.

The TRS controller 130 can include a microprocessor (not shown) that is configured to make various operating decisions in response to the real time prime mover condition information received from sensors. The operating decisions generated by the TRS controller 130 can then be used to operate the prime mover 110.

FIG. 2A further shows that the TRS controller 130 is configured to be in electrical communication with a memory unit 135, and an operator interface 136. The TRS controller 130, the memory unit 135 and the operator interface 136 can be incorporated into a TRS controller panel 170. In some embodiments, the memory unit 135 may be a Random Access Memory ("RAM") that can maintain a data log related to parameters of the prime mover 110 and the generator 150, as a well as other data.

In operation, the TRS controller 130 operates the prime mover 110. For example, the TRS controller 130 can be configured to operate the prime mover 110 at a first constant speed and a second constant speed that is lower than the first constant speed. In some embodiments, for example as shown above, the first constant speed can be ~2200 RPMs and the second constant speed can be ~1450 RPMs.

Generally speaking, fuel efficiency changes when the operation condition of the prime mover changes. For example, if the load on the prime mover 110 is high, for example at about ~80% of the maximum load capacity of the prime mover 110, the prime mover 110 can be more fuel efficient (i.e. can consume less fuel) at ~2200 RPMs. On the other hand, if the load on the prime mover 110 is low, for example at about ~20% of the maximum load capacity of the prime mover 110, the prime over 110 can be more efficient at ~1450 RPMs.

A threshold of prime mover load on the prime mover 110 may be determined, for example at ~50% prime mover load, so that if the prime mover 110 operates at a prime mover load that is above the threshold, then the prime mover 110 can be operated at ~2200 RPMs for better fuel efficiency. If the prime mover 110 operates at a load that is below the threshold, then the prime mover 110 can be operated at about ~1450 RPMs for more efficiency. It is to be noted that the ~50% threshold is exemplary. The threshold on which the prime mover 110 should switch operating speed for more efficiency can be determined, for example, by testing.

It is to be noted that a prime mover operation condition can be measured by parameters other than the load in the prime mover, and the TRS controller 130 can be configured to obtain the real time prime mover operation condition and provide a prime mover operation condition value. Parameters that are correlated to the prime mover operation condition may include shaft speed of the prime mover, an amount of fuel delivered to the prime mover and/or an air intake flow. The TRS controller 130 can be configured to obtain these parameters as the prime mover operation condition value. A threshold may be established for each parameter to help determine the optimal prime mover speed of the prime mover 110. As used herein, the term "optimal" means desirable in the sense of minimizing fuel consumption, maximizing emission control, or maximizing noise reduction according to prime mover conditions, such as system ages, ambient conditions, or the like, and need not be optimal in an absolute sense. Accordingly, as used herein the meaning of the term "optimal" can vary based on user requirements.

It is to be noted that the parameters obtained by the TRS controller 130, such as the shaft speed, the amount of fuel delivered to the prime mover and an air intake flow, may be correlated to the prime mover load of the prime mover 110. Therefore, by monitoring these parameters, the prime mover load of the prime mover 110 can also be effectively monitored.

It is to be understood that the microprocessor of the TRS controller 130 can also be configured to calculate a prime mover operation condition value based on the parameters obtained by the TRS controller 130. For example, the amount of fuel delivered to the prime mover and the air intake flow are correlated to the prime mover load. The microprocessor of the TRS controller 130 can be configured to calculate the prime mover load based on the amount of fuel delivered and/or the air intake flow as the prime mover operation condition value. The microprocessor of the TRS controller 130 can also be configured to calculate and transmit prime mover torques, a prime mover percent rated torque at the current speed, and/or a calculated torque minus a peak torque at a constant speed, etc. based on the parameters obtained by the TRS controller 130 as the prime mover operation condition value.

The memory unit 135 can be configured to store a pre-entered process. The process may be entered by an operator through the operator interface 136. Alternatively, the process may be entered into the memory unit 135 during a manufacturing process of the TRS controller panel 170. The process contains a prime mover operation condition threshold that can be set by an operator. The TRS controller 130 can be configured to compare the actual prime mover operation condition value received from the TRS controller 130 to the prime mover operation condition threshold stored in the memory unit 135, and calculate a reference value for the prime mover, e.g., a maximum prime mover output, a maximum prime mover speed, a maximum prime mover torque, etc.

Figure 4A:
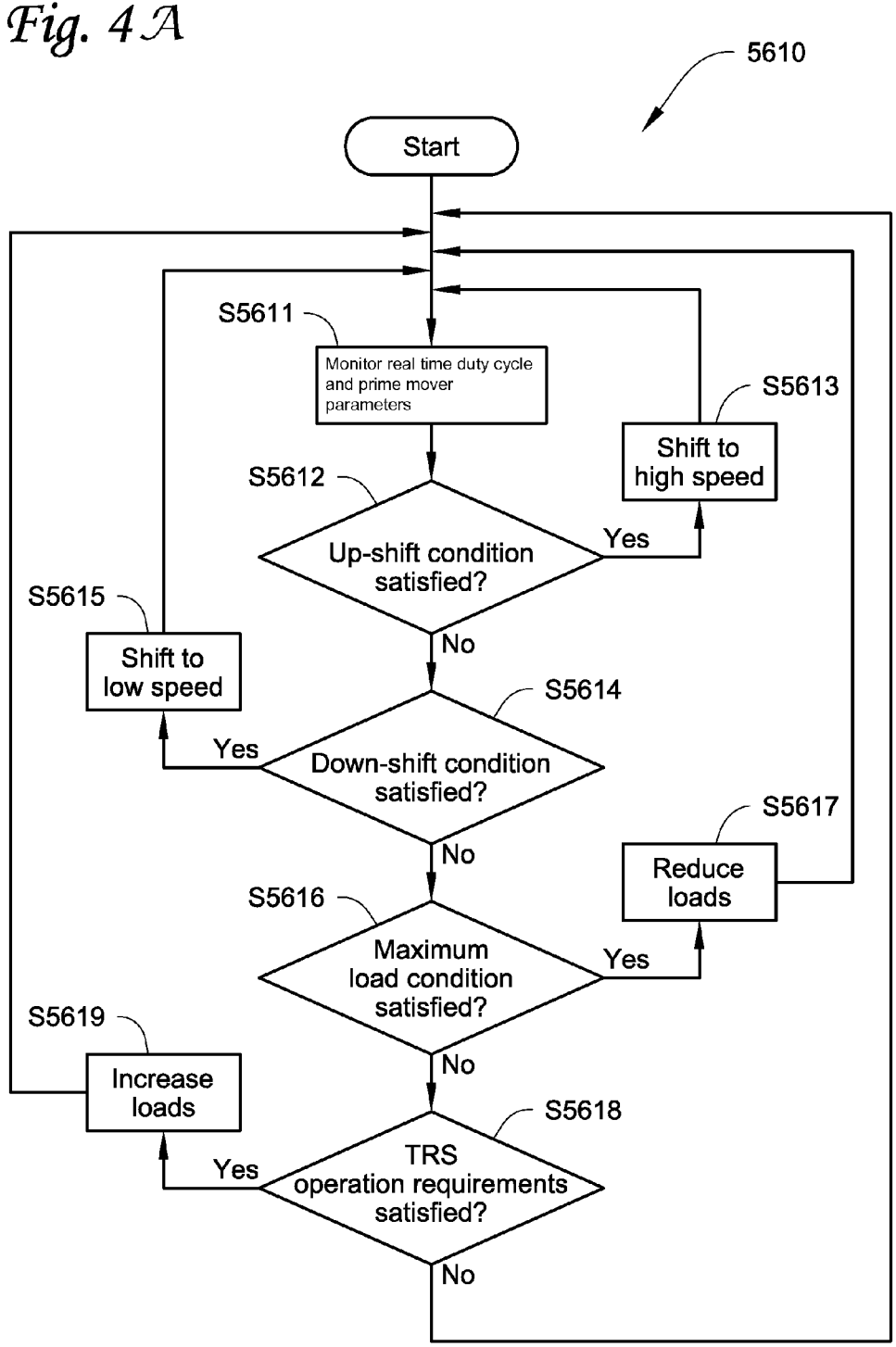
FIG. 4A is a flow chart of one embodiment of a control method as shown in FIG. 3, with the prime mover speed being changed between at least two constant speeds.

In some embodiments, the decision of the TRS controller 130 may be based on more than one prime mover operation threshold. For example, as shown in FIG. 4A, in one embodiment, there is an up-shift point (USP) where, when the up-shift point is met, the prime mover speed is changed from the low speed to the high speed and a down-shift point (DSP) where, when the down-shift point is met, the prime mover speed is changed from the high speed to the low speed. As discussed above, fuel efficiency changes when the operation condition of the prime mover changes. When the load on the prime mover 110 is high, for example at about ~80% of the maximum load capacity of the prime mover 110, the prime mover 110 is more fuel efficient (i.e. consumes less fuel) at the high speed, e.g., ~2200 RPMs. On the other hand, if the load on the prime mover 110 is low, for example at about ~20% of the maximum load capacity of the prime mover 110, the prime over 110 is more efficient at the low speed, e.g., ~1450 RPMs.

The decision of the TRS controller 130 to change the prime mover speed can be triggered by the up-shift and down-shift points. In one embodiment, the up-shift point may be ~75% full rated prime mover output torque, and the down shift point may be ~50% full rated prime mover output torque.

The decision made by the TRS controller 130 may be transmitted to the prime mover 110 by different methods. For example, if the decision of the more efficient RPM for the prime mover 110 is at the first constant speed, the TRS controller 130 can be configured to adjust the prime mover 110 to operate at the first constant speed. Likewise, if the decision of the more efficient RPM for the prime mover 110 is at the second constant speed, the TRS controller 130 can be configured to adjust the prime mover 110 to operate at the second constant speed.

The TRS controller 130 can be configured to monitor the prime mover operation condition continuously or at a constant interval. The prime mover 110 is configured to maintain the first constant speed or the second constant speed until the TRS controller 130 sends out a signal to the prime mover 110 to switch the prime mover 110 to another constant speed.

When the prime mover 110 operates at the first constant speed, the generator 150 operates at the high frequency and the high output voltage. When the prime mover 110 operates at the second constant speed, the generator 150 operates at the low frequency and the low output voltage. Under normal operating conditions, the prime mover 110 operates at one of the first constant speed or the second constant speed such that the frequency and the output voltage of the generator 150 remain substantially constant relative to the prime mover speed.

It is to be appreciated that the TRS controller 130 can be configured to obtain other parameters of the prime mover operation condition, such as a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, a noise level, or the like. For example, the TRS controller 130 can be configured to receive an exhaust gas temperature measured by a temperature sensor positioned in an exhaust of the prime mover 110. The TRS controller 130 can then determine the operating speed (e.g., a low speed or a high speed for a two-speed prime mover and a varying speed for a variable speed compressor) of the prime mover 110 based on the exhaust gas temperature.

Figure 2B:
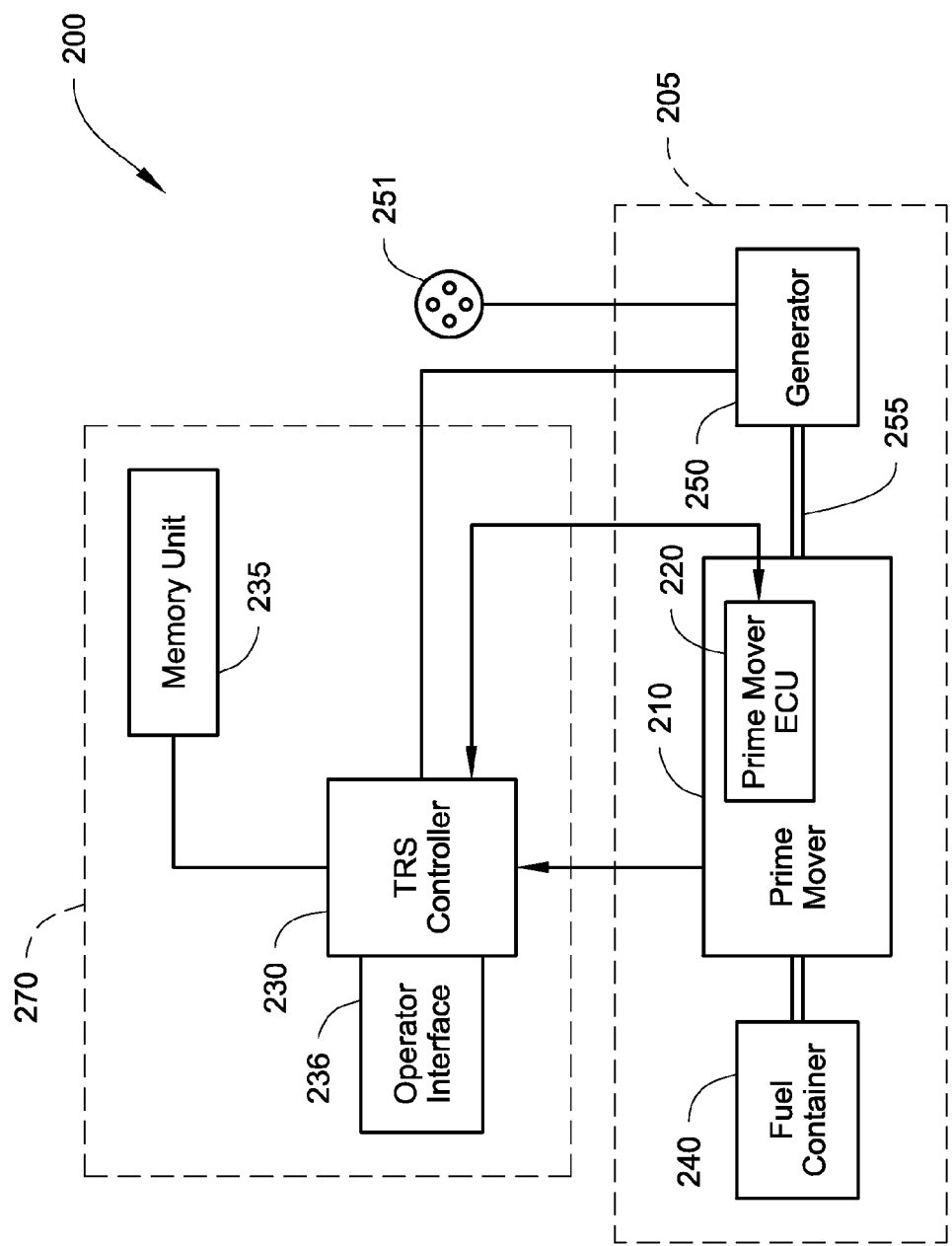
FIG. 2B is a schematic view of a generator set including an electronic control unit (ECU).

FIG. 2B illustrates an alternative embodiment of a transport refrigeration system 200 including a generator set 205 and a TRS controller 230, where the prime mover 210 is an electronically controlled prime mover.

It is to be understood that the prime mover 210 described below is a variable speed prime mover. However, the prime mover 210 can also be a multi-speed prime mover.

That is, the prime mover 210 includes a prime mover electronic controller unit (ECU) 220. The ECU 220 is electronically connected to the TRS controller 230 for controlling the operation of the prime mover 210. The generator set 205 also includes a fuel container 240 and a generator 250. The transport refrigeration system 200 can be disposed in the housing 14 as shown in FIG. 1.

The ECU 220 can be configured to regulate an amount of fuel delivered to the prime mover 210 and can be configured to operate the prime mover 210 at least at a high speed and a low speed. The ECU 220 is configured so that the prime mover 210 can be maintained at least at either the high speed or the low speed regardless of a prime mover load on the prime mover 210.

The ECU 220 is coupled with the TRS controller 230. The TRS controller 230 is configured to receive information from the ECU 220, and command the ECU 220 to vary the speed of the prime mover 210 between the high speed and the low speed. In the illustrated embodiment, the high speed can be ~2200 RPMs, and the low speed can be ~1450 RPMs. In other embodiments, the high and low speeds may be different from ~2200 RPMs and ~1450 RPMs, respectively.

The ECU 220 is configured to monitor real time prime mover operation condition and control the operation of the prime mover 210. The ECU 220 may have a microprocessor that can communicate with an array of sensors that are configured to obtain initial prime mover operation parameters, such as a prime mover speed (RPM), a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, a noise level, or the like. By analyzing the readings from the array of sensors, the ECU 220 can determine the operation conditions of the prime mover 210 in real time. The ECU 220 can be also configured to control a fuel pump (not shown) so that the amount of fuel delivered to combustion chambers of the prime mover 210 can be controlled by the ECU 220. By regulating the amount of fuel delivered, the ECU 220 can be configured to maintain the prime mover 210 at a constant speed even when the load on the prime mover 210 changes. In the illustrated embodiment as shown in FIG. 2B, the ECU 220 is configured so that the ECU 220 can maintain the prime mover 210 at least at two constant speeds, for example ~1450 RPMs and ~2200 RPMs.

As described above, the TRS controller 230 is coupled with the ECU 220. The connection between the TRS controller 230 and the ECU 220 can be a two way electronic communication system. As discussed above, the ECU 220 can be configured to obtain the prime mover conditions in real time. The ECU 220 can then send the prime mover condition information to the TRS controller 230.

The TRS controller 230 can be a microprocessor that is configured to make various operating decisions in response to the real time prime mover condition information received from the ECU 220. The operating decisions generated by the TRS controller 230 can then be transmitted to the ECU 220 via the coupling between the ECU 220 and the TRS controller 230. After receiving the operating decisions transmitted from the TRS controller 230, the ECU 220 may then operate the prime mover 210 in accordance with the operating instructions transmitted from the TRS controller 230.

FIG. 2B further shows that the TRS controller 230 can be configured to be in electrical communication with a timer 234, a memory unit 235, and an operator interface 236 of the TRU. The TRS controller 230, the memory unit 235 and the operator interface 236 can be incorporated into a controller panel 270.

In some embodiments, the memory unit 235 may be a Random Access Memory ("RAM") that can maintain a data log related to parameters of the prime mover 210 and the generator 250, as a well as other data.

In operation, the TRS controller 230 and the ECU 220 can work together to operate the prime mover 210. For example, the ECU 220 can be configured to operate the prime mover 210 at a first constant speed and a second constant speed that is lower than the first constant speed. In some embodiments, for example as shown above, the first constant speed can be ~2200 RPMs and the second constant speed can be ~1450 RPMs.

It is to be noted that the prime mover operation condition can be measured by parameters other than the load on the prime mover. The ECU 220 can be configured to obtain the real time prime mover operation condition and provide a prime mover operation condition value. Parameters that are correlated to the prime mover operation condition may include a shaft speed of the prime mover, an amount of fuel delivered to the prime mover and/or an air intake flow. The ECU 220 can be configured to obtain these parameters and transmit values of these parameters to the TRS controller 230 as the prime mover operation condition value. The TRS controller 230 can be configured to receive the prime mover operation condition value transmitted from the ECU 220. The relationship between the fuel efficiency and these prime mover operation condition parameters can be established, for example, by testing. Also, a threshold may be established for each parameter to help determine the optimal prime mover speed of the prime mover 210.

It is to be noted that the parameters obtained by the ECU 220, such as the shaft speed, the amount of fuel delivered to the prime mover and an air intake flow, may be correlated to the load on the prime mover 210. Therefore, by monitoring these parameters, the load on the prime mover 210 can also be effectively monitored.

It is to be understood that the microprocessor of the ECU 220 can also be configured to calculate a prime mover operation condition value based on the parameters obtained by the ECU 220. For example, the amount of fuel delivered to the prime mover and the air intake flow are correlated to the load on the prime mover 210. The ECU 220 can be configured to calculate the prime mover load based on the amount of fuel delivered and/or the air intake flow and transmit the calculated prime mover load to the TRS controller 230 as the prime mover operation condition value. The microprocessor of the ECU 220 can also be configured to calculate transmit prime mover torques, prime mover percent rated torque at the current speed, and/or calculated torque minus peak torque at a constant speed, etc. based on the parameters obtained by the ECU 220 and transmit these calculated values to the TRS controller 230 as the prime mover operation condition value.

A prime mover control process contains a prime mover operation condition threshold that can be set by an operator. The microprocessor of the TRS controller 230 can be configured to compare the actual prime mover operation condition value received from the ECU 220 to the prime mover operation condition threshold stored in the memory unit 23 and make a decision on whether to switch the operating RPM of the prime mover 210. The TRS controller 230 can be configured to send this decision back to the ECU 220.

Figure 3:
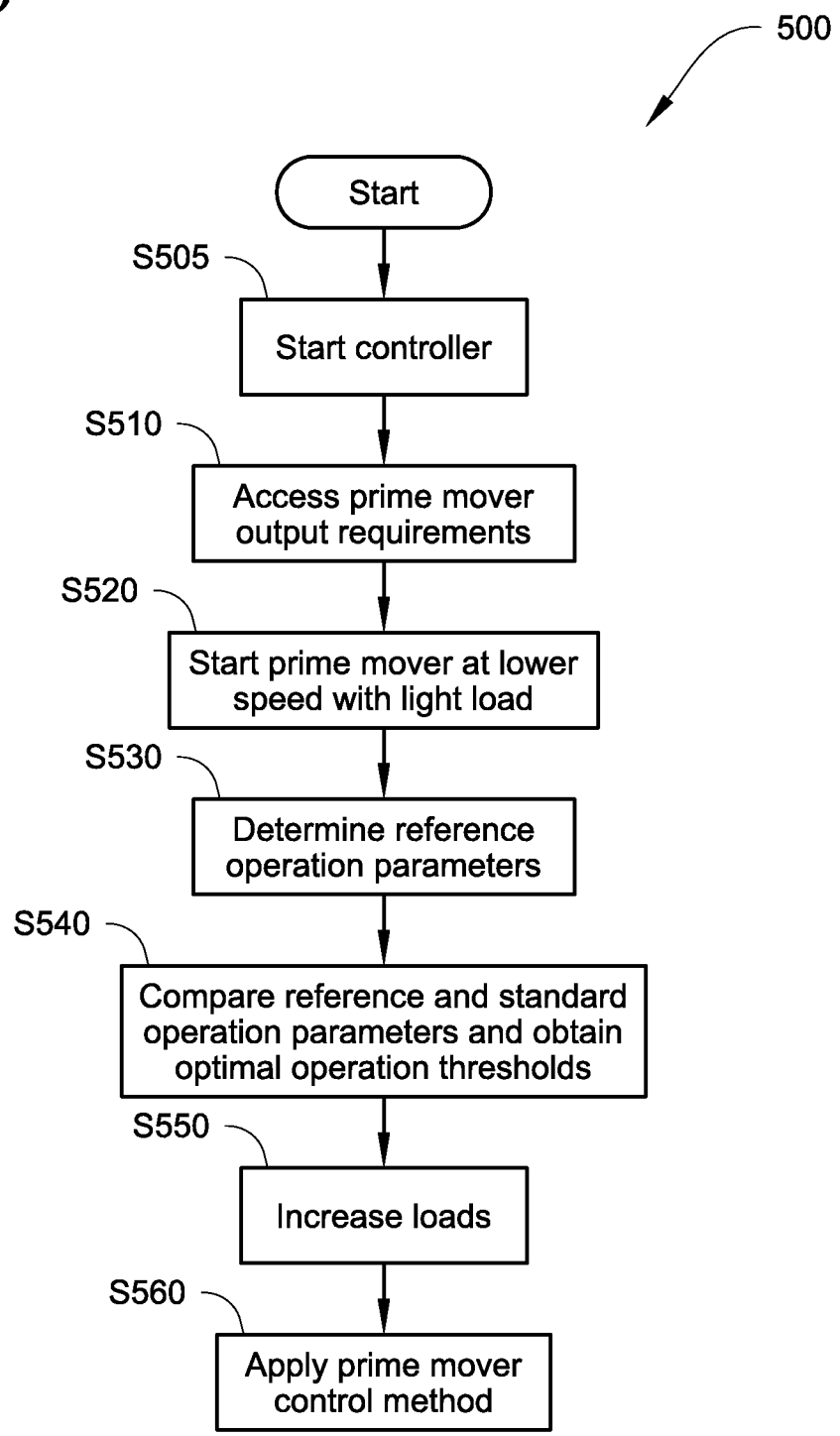
FIG. 3 is a flow chart of the operation of the generator set as shown in FIG. 2A or FIG. 2B.

In some embodiments, the decision of the TRS controller 230 may be based on more than one threshold. For example, as shown in FIG. 3, in one embodiment, there is one up-shift point and one down-shift point. The decision of the TRS controller 230 to change the prime mover speed can be trigged by the up-shift and down-shift shift points.

The decision made by the TRS controller 230 may be transmitted to the ECU 220 by different methods. For example, the microprocessor of the TRS controller 230 may interpret the decision by outputting different voltage signals. For example, if the decision of the more efficient RPM for the prime mover 210 is at the first constant speed, the microprocessor of the TRS controller 230 can be configured to output a high voltage signal. Likewise, if the decision of the more efficient RPM for the prime mover 210 is at the second constant speed, the microprocessor of the TRS controller 230 can be configured to output a low voltage signal. The high and the low voltage signals can be transmitted to the ECU 220.

The ECU 220 can be configured to measure the voltage signals received from the TRS controller 230. When a high voltage signal is received, the microprocessor of the ECU 220 can be configured to adjust the prime mover 210 to operate at the first constant speed. When a low voltage signal is received, the microprocessor of the ECU 220 can be configured to adjust the prime mover 210 to operate at the second constant speed. The ECU 220 can be configured to monitor the voltage output of the TRS controller 230 continuously or at a constant interval. The ECU 220 can be configured to maintain the prime mover 210 at the first constant speed or the second constant speed until the ECU 220 receives a voltage signal from the TRS controller 230 that is associated with the constant speed that is different from the current operating speed of the prime mover 210. The ECU 220 may then be configured to adjust the prime mover 210 so that the prime mover 210 is switched to the other constant speed.

It is to be appreciated that the ECU 220 can be configured to obtain other parameters of the prime mover operation condition, such as a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, a noise level, or the like. The ECU 220 then transmits the value to the TRS controller 230. For example, the ECU 220 can be configured to receive an exhaust gas temperature measured by a temperature sensor positioned in an exhaust of the prime mover 210. It is to be noted that in some embodiments, the TRS controller 230 may be configured to receive the exhaust gas temperature directly. The TRS controller 230 can then determine the operating speed of the prime mover 210 based on the exhaust temperature.

FIG. 3 shows a flow chart of a process 500 for operating a generator set 105 of FIG. 2A, when the prime mover 110 operates at a first speed and a second speed that is lower than the first speed. After the generator set 105 is started, the TRS controller 130 is first turned on at S505 before the prime mover 110 is turned on. Then, at S510, the TRS controller 130 starts accessing prime mover output requirements by sensing various system conditions of the TRS 100 from sensors, for example, a manifold pressure intake, an exhaust manifold, etc.

At S520, the TRS controller 130 starts the prime mover 110 at a low speed, for example, ~1450 RPMs. At this point, the prime mover 110 is lightly loaded, e.g., with ~5%-~15% load as a minimum load requirement threshold, to allow the TRS controller 130 to obtain one or more reference operation parameters and generate a reference matrix. In one embodiment when the prime mover 110 is connected with a direct-drive scroll compressor, the light load can be established by unloading e.g., ~90% of the scroll load. In an alternative embodiment when the prime mover 110 is run with a directly coupled generator, a lighter load can be established by unloading a directly coupled generator, thereby allowing the reference operation parameters to be obtained. In other embodiments, a lighter load can be established by unloading a compressor of the TRS 100 when desired.

Then, at S530, one or more reference operation parameters are obtained. The reference operation parameters can include, for example, a prime mover output, a prime mover torque, a prime mover fuel consumption, a prime mover speed, etc. when the prime mover 110 is started.

The one or more reference operation parameters obtained at S530 are then compared at S540 with standard operation parameters of the prime mover 110 by the TRS controller 130. The standard operation parameters can be original, factory-set operation parameters for the specific prime mover 110 that have been stored in the TRS controller 130 as a part of factory processes. The differences between the reference operation parameters and the standard operation parameters can be due to the differences between the present system and/or ambient conditions (such as and the original system operation conditions including, for example, generator set system age, wear, parasitic friction, fuel temperature, fuel quality, ambient temperature, oxygen content of air, etc.

Also, at S540, the TRS controller determines one or more optimal operation thresholds based on a comparison between the standard operation parameters stored in the TRS controller 130 and the reference operation parameters (which can reflect the present condition of the TRS 100 and the outside ambient conditions) obtained at S530. That is, in some embodiments a reference matrix can be generated based on the comparison between the standard operation parameters stored in the TRS controller 130 and the reference operation parameters obtained at S530. In particular, in one embodiment, the reference matrix can be generated based on the differences between the standard operation parameters and the reference operation parameters.

The reference matrix can reflect the present condition of the TRS 100 and ambient conditions surrounding the TRS 100. This can include, for example, the present TRS age, prime mover fuel temperature, prime mover fuel quality, oxygen content of air surrounding the prime mover, etc. Accordingly, a more accurate operating capability of the prime mover can be determined than by simply using standard operation parameters that may merely reflect an initial generic condition of the components (e.g., the prime mover 110) within the TRS 100 without regard to variances of these components based on variances in manufacturing, assembly, use, wear and tear, environment, etc.

The standard operation thresholds can then be adjusted by the reference matrix. As a result, optimal operation thresholds specifically calculated for the present condition of the TRS 100 and the ambient conditions surrounding the TRS 100. The optimal operation thresholds include control thresholds used in different control methods. After the optimal operation thresholds are determined at S540, actual loads are added to the prime mover 110 at S550, and then the control method of the prime mover 110 is applied at S560.

In a specific control method 5610 as shown in FIG. 4A, a real time duty cycle and prime mover operation parameters are monitored. The prime mover 110 is controlled by a control method including 1) a down-shift point (DSP), 2) an up-shift point (USP), and 3) a maximum load point (MLP). When both the real time duty cycle and the down-shift point are met, the prime mover speed is changed from a high speed to a low speed. When both the real time duty cycle and the up-shift point are met, the prime mover speed is changed from the low speed to the high speed. The maximum load point is a value that corresponds to a certain percentage of the maximum prime mover load, where when the value is reached, the load of the prime mover 110 needs to be reduced to allow safe operation of the prime mover. In one embodiment, the maximum load point is ~95% prime mover load. In the embodiment as shown in FIGS. 3 and 4A, the optimal operation thresholds determined at S540 at least include an optimal down-shift point, an optimal up-shift point and an optimal maximum load point.

Figure 4B:
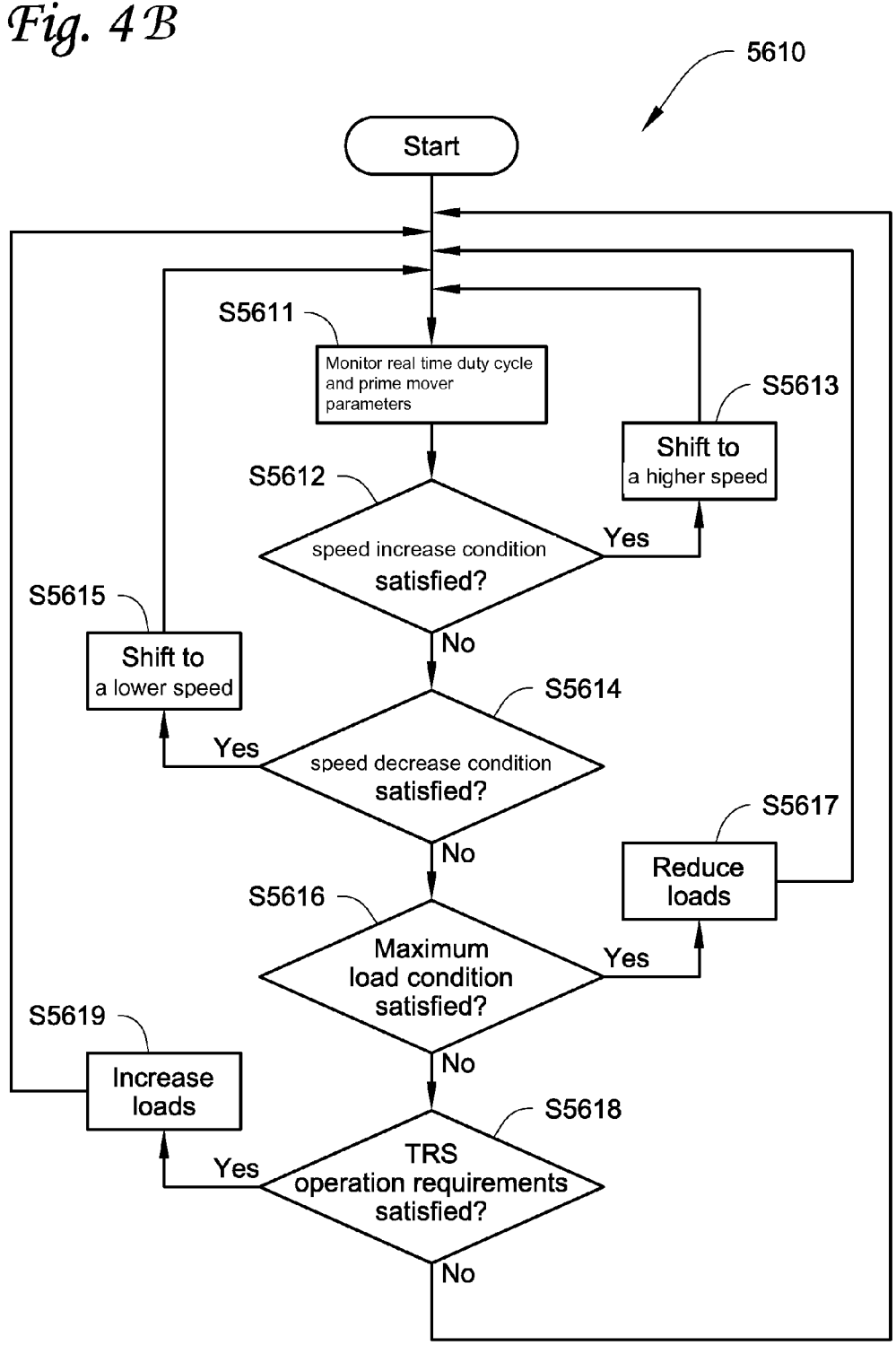
FIG. 4B is a flow chart of a further embodiment of the control method as shown in FIG. 3, with the prime mover speed being changed continuously.

In an alternative method 5620 as shown in FIG. 4B, the prime mover 110 is controlled by a different control method including a target speed change value used to continuously change the speed of the prime mover 110.

In one embodiment, a duty cycle and one or more prime mover operation parameters are monitored. The prime mover 110 is controlled by a control method including 1) a speed decrease condition, 2) a speed increase condition, and 3) a maximum load point (MLP). When both the duty cycle and the speed decrease condition are met, the prime mover speed can be decreased. When both the duty cycle and the speed increase condition are met, the prime mover speed can be increased. In some embodiments, the speed can be increased or decreased by a predetermined amount during each duty cycle. Additionally, in one example of these embodiments, the speed can be increased or decreased by a predetermined amount during each duty cycle until, for example, the optimal prime mover speed is reached or some other condition is satisfied. In other embodiments, the speed can be increased or decreased directly to the optimal prime mover speed, as discussed below with reference to FIG. 5.

Figure 5:
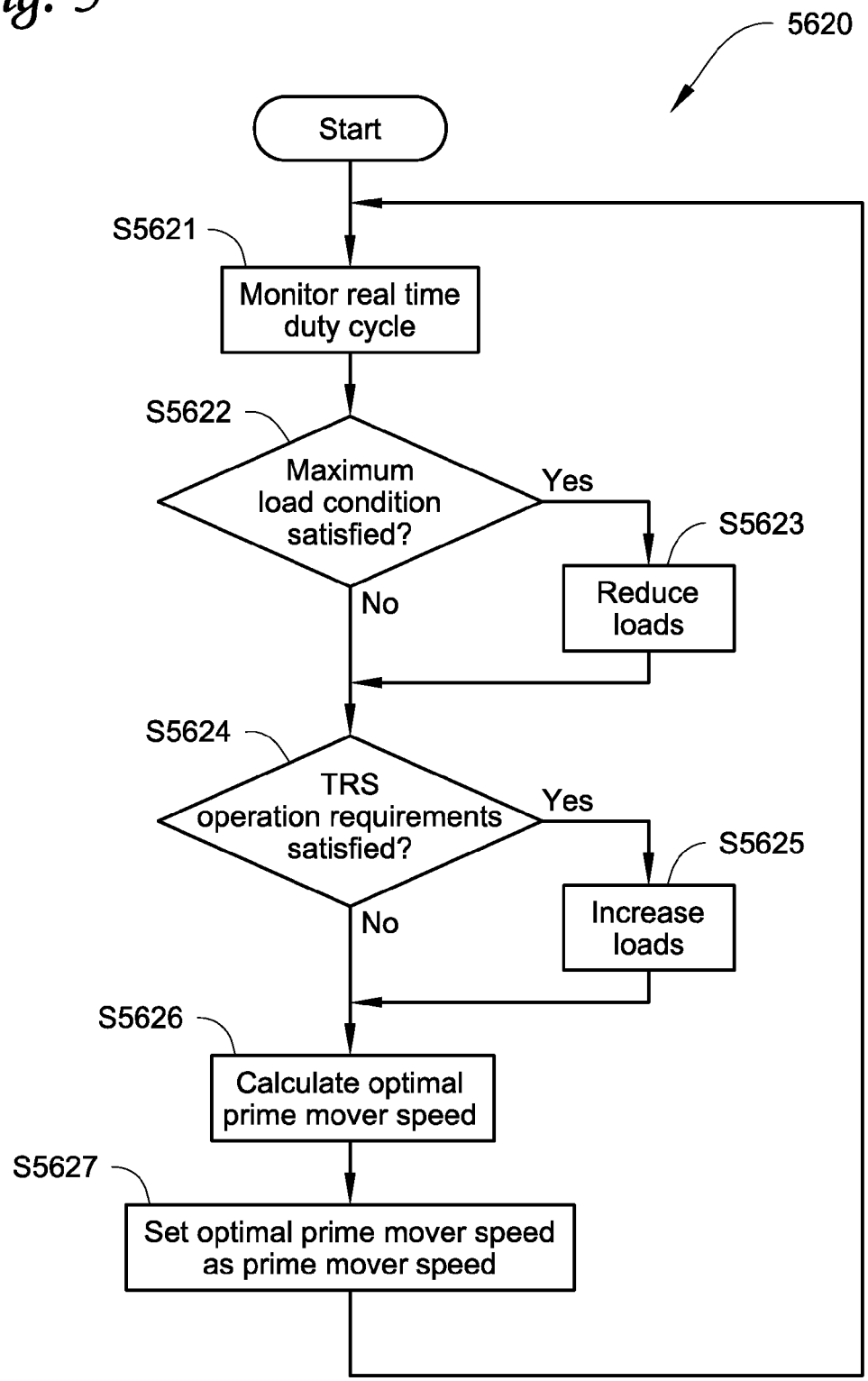
FIG. 5 is a flow chart of a further embodiment of the control method as shown in FIG. 4B, with the prime mover speed being changed based on an optimal prime mover speed calculated.

Alternatively, an optimal prime mover speed can be calculated so that the prime mover 110 always operates in the optimal mode. As shown in FIG. 5, when the target speed change value is met, the speed of the prime mover 110 is changed. In the embodiment as shown in FIG. 3, the optimal operation thresholds determined at S40 at least include an optimal target speed change value.

With reference to FIG. 4A, an embodiment of the control method of the prime mover 110 applied at S560 is described in more detail below. At S5611, the real-time duty cycle and prime mover operation parameters are monitored and the prime mover operation parameters, for example, the prime mover percent rated output torque, are measured. At S5612, the TRS controller 130 checks if the real time duty cycle and an up-shift condition are satisfied. In one embodiment, the up-shift condition is satisfied if the prime mover 110 is running at the low speed and one of the optimal operation thresholds, i.e., the optimal up-shift point, is reached. In a more specific embodiment, the up-shift condition is satisfied if the prime mover 110 is running at the low speed and the prime mover percent rated output torque reaches the optimal up-shift point.

If the answer at S5612 is Yes, the TRS controller 130 initializes a speed change from the low speed to the high speed for the prime mover 110 in the next duty cycle at S5613. Speed change from one mode to the next is computer controlled within about a 1-second or less transition phase. Then the TRS controller 130 goes to S5611 and continues.

If the answer at S5612 is No, the TRS controller 130 checks if the real time duty cycle and a down-shift condition is satisfied at S5614. In this embodiment, the down-shift condition is satisfied if the prime mover 110 is running at a high speed and one of the optimal operation thresholds, e.g., the down-shift point, is reached. In a more specific embodiment, the down-shift condition can be satisfied if the prime mover 110 is running at a high speed and prime mover percent rated output torque reaches the optimal down-shift point.

If the answer at S5614 is Yes, the TRS controller 130 initializes a speed change from the high speed to the low speed for the prime mover 110 in the next duty cycle at S5615. Speed change from one mode to the next is computer controlled within about a 1-second or less transition phase. Then the TRS controller 130 goes to S5611 and continues.

If the answer at S5614 is No, the TRS controller 130 checks if a maximum load condition is satisfied at S5616. In this embodiment, the maximum load condition is satisfied if the prime mover 110 is running at the high speed and one of the optimal operation thresholds, i.e., the optimal maximum load point, is reached. In a more specific embodiment, the maximum load condition is satisfied if the prime mover 110 is running at the high speed and the prime mover percent rated output torque reaches the optimal maximum load point.

If the answer at S5616 is Yes, the TRS controller 130 instructs the generator set 105 to shed loads for the prime mover 110 in the next duty cycle at S5617 in order to avoid overloading the prime mover 110. The loads are shed in an order defined by a user. In one embodiment, the loads are shed in the following order: compressor load, electrical load, battery load, etc. Then the TRS controller 130 goes to S5611 and continues.

If the answer at S5616 is No, the TRS controller 130 checks if the TRS operation requirements is satisfied at S5618.

If the answer at S5618 is Yes, the TRS controller 130 adds loads back in the next duty cycle at S619. The loads are added in an order defined by a user. In one embodiment, the loads are added in the following order: battery load, electrical load, compressor load, etc. Then the TRS controller 130 goes to S5610 and continues.

If the answer at S5619 is No, the TRS controller 130 goes back to S5611 and continues.

It is to be understood that, in some embodiments, only prime mover operation parameters are monitored, while a real time duty cycle is not being monitored. As a result, as long as the down-shift point or the up-shift point is met, the prime mover speed is changed accordingly.

It is to be understood that the processes in FIGS. 3 and 4A, including the control method of the prime mover in FIG. 4A, are also applicable to the generator set 200 as shown in FIG. 2B, if the prime mover 210 in FIG. 2B operators at a first speed and a second speed that is lower than the first speed. The ECU prime mover 210 can also operate with a continuously changed speed to allow the prime mover to always operate in an optimal operation mode. As a result, an alternative control method of the prime mover 210 applied at S560 can be used. This alternative control method is illustrated in FIGS. 4B and 5.

In an alternative method 5620 as shown in FIG. 4B, the prime mover 110 is controlled by a different control method including a target speed change value used to continuously change the speed of the prime mover 110.

As shown in FIG. 4B, in one embodiment, a real time duty cycle and prime mover operation parameters are monitored. The prime mover 110 is controlled by a control method including 1) a speed decrease condition, 2) a speed increase condition, and 3) a maximum load point (MLP). When both the real time duty cycle and the speed decrease condition are met, the prime mover speed is changed from a high speed to a lower speed. When both the real time duty cycle and the speed increase condition are met, the prime mover speed is changed from the low speed to the higher speed.

To determine the value of the lower speed or the higher speed, the value can be determined by increasing or decreasing a set amount of speed. Alternatively, an optimal prime mover speed can be calculated so that the prime mover 110 always operates in the optimal mode. As shown in FIG. 5, when the target speed change value is met, the speed of the prime mover 110 is changed. In the embodiment as shown in FIG. 3, the optimal operation thresholds determined at S40 at least include an optimal target speed change value.

Referring to FIG. 5, at S5621, the real-time duty cycle and one or more prime mover operation parameters are monitored and the related real time operation parameters, for example, the prime mover percent rated output torque, are measured.

At S5622, the TRS controller 230 checks if a maximum load condition is satisfied. In this embodiment, the maximum load condition is satisfied if one of the optimal operation thresholds, i.e., the optimal maximum load point, is reached. In a more specific embodiment, the maximum load condition is satisfied if the prime mover percent rated output torque reaches the optimal maximum load point.

If the answer at S5622 is Yes, the TRS controller 230 instructs the generator set 200 to shed loads for the prime mover 210 in the next duty cycle at S5623 in order to avoid overloading the prime mover 210. The loads are shed in an order defined by a user. In one embodiment, the loads can be shed in the following order: compressor load, electrical load, battery load, etc. Then the TRS controller 230 goes to S5624.

If the answer at S5622 is No, the TRS controller 230 goes to S5624 directly without shedding loads.

At S5624, the TRS controller 230 checks if a TRS operation requirements is satisfied.

If the answer at S5624 is Yes, the TRS controller 230 adds loads back in the next duty cycle at S5625. The loads are added in an order defined by a user. In one embodiment, the loads can be added in the following order: battery load, electrical load, compressor load, etc. Then the TRS controller 230 goes to S5626.

If the answer at S5624 is No, the TRS controller 230 goes to S5626 directly, without adding loads.

At S5626, the TRS controller 230 calculates an optimal speed of the prime mover 210 based on the reference operation parameters obtained in at S530 as shown in FIG. 3 and the standard operation parameters stored in the TRS controller 230. Then at S5627, the TRS controller 230 sets the optimal speed for the prime mover 210 for the next duty cycle.

It is to be understood that in embodiments as shown in FIGS. 4B and 5, a real time duty cycle is not being monitored and only prime mover operation parameters are monitored. As a result, as long as the down-shift point or the up-shift point is met, the prime mover speed is changed accordingly.

In some embodiments, the reference operation parameters and the reference matrices can be stored over time, for example, in a TRS controller of the TRS. Accordingly, changes to the TRS and the environment surrounding the TRS that occur over time can be tracked and this information can be made accessible to the owner and/or user of the TRS.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

Aspects:

It is noted that any of aspects 1-8 below can be combined with any of aspects 9-15 and aspects 16-17. Also, any of aspects 9-15 below can be combined with any of aspects 16-17.

Aspect 1. A method of evaluating operating capability of a prime mover, comprising:
starting the prime mover with a minimum load requirement threshold;
obtaining a reference prime mover operation parameter for the prime mover;
comparing the reference prime mover operation parameter with a standard prime mover operation parameter;
generating a reference matrix based on the comparison of the reference prime mover operation parameter with the standard prime mover operation parameter; and
adjusting via a controller a standard operation threshold based on the reference matrix.

Aspect 2. The method of aspect 1, further comprising:
obtaining an optimal operation threshold by adjusting the standard operation threshold based on the reference matrix;
monitoring an operation parameter and determining whether the optimal operation threshold is reached; and
adjusting a prime mover speed when the optimal operation threshold is reached.

Aspect 3. The method of any of aspects 1-2, wherein the reference matrix includes one or more of a prime mover speed (RPM), a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, and a noise level.

Aspect 4. The method of any of aspects 1-3, wherein the minimum load requirement threshold is a ~5%-~15% prime mover load.

Aspect 5. The method of any of aspects 1-4, wherein the optimal operation threshold includes an up-shift point, and
the controller instructing the prime mover to switch from a second speed to a first speed when the up-shift point is reached.

Aspect 6. The method of any of aspects 1-5, wherein the optimal operation threshold includes a down-shift point, and
the controller instructing the prime mover to switch from the first speed to the second speed when the down-shift point is reached.

Aspect 7. The method of any of aspects 1-6, wherein the optimal operation threshold includes a maximum load point, and
the TRS controller instructing the prime mover to shed load when the maximum load print is reached.

Aspect 8. The method of any of aspects 1-7, wherein the reference matrix reflects one or more of a prime mover age, a prime mover fuel temperature, a prime mover fuel quality and an oxygen content of air surrounding the prime mover.

Aspect 9. A load control system for a transportation refrigeration system (TRS), comprising:
 a prime mover; and
 a TRS controller,
 wherein the TRS controller is configured to obtain a reference prime mover operation parameter when the prime mover is started with a minimum load requirement threshold; and
 wherein the TRS controller is configured to compare the reference prime mover operation parameter with a standard prime mover operation parameter, generate a reference matrix based on the comparison between the reference prime mover operation parameter and the standard prime mover operation parameter, and use the reference matrix to adjust a standard operation threshold.

Aspect 10. The system of aspect 9, wherein the TRS controller is configured to obtain an optimal operation threshold based on the reference matrix, monitor an operation parameter and determine whether the optimal operation threshold is reached, and adjust a prime mover speed when the optimal operation threshold is reached.

Aspect 11. The system of any of aspects 9-10, wherein the reference matrix includes one or more of a prime mover speed (RPM), a prime mover output, a prime mover torque, a prime mover fuel consumption, an amount of fuel delivered to the prime mover, an exhaust gas temperature, a prime mover oil temperature, a prime mover coolant temperature, an air intake flow speed, a piston position, and a noise level.

Aspect 12. The system of any of aspects 9-11, wherein the minimum load requirement threshold is a ~5%-~15% prime mover load.

Aspect 13. The method of any of aspects 9-12, wherein the optimal operation threshold includes an up-shift point, and
 wherein the TRS controller is configured to instruct the prime mover to switch from a second speed to a first speed when the up-shift point is reached.

Aspect 14. The method of any of aspects 9-13, wherein the optimal operation threshold includes a down-shift point, and
 wherein the TRS controller is configured to instruct the prime mover to switch from the first speed to the second speed when the down-shift point is reached.

Aspect 15. The system of any of aspects 9-14, wherein the optimal operation threshold includes a maximum load point, and
 wherein the TRS controller is configured to instruct the prime mover to shed load, when the maximum load point is reached.

Aspect 16. A load control method by using a transport refrigeration system (TRS) controller, comprising:
 instructing a prime mover of a transport refrigeration system to start with a minimum load requirement threshold;
 obtaining a reference prime mover operation parameter for the prime mover;
 generating a reference matrix for the prime mover based on the reference prime mover operation parameter; and
 adjusting via the TRS controller a standard operation threshold based on the reference matrix.

Aspect 17. The method of aspect 16, further comprising:
 monitoring an operation parameter and determining whether an optimal operation threshold is reached; and
 when the optimal operation threshold is reached, changing a prime mover speed.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

What claimed is:

1. A load control system for a transportation refrigeration system (TRS), comprising:
 a prime mover; and
 a TRS controller,
 wherein the TRS controller is configured to
  start the prime mover;
  operate the prime mover with a minimum load, the minimum load being less than a full load on the prime mover;
  obtain one or more current operation parameters of the system from one of more sensors when operating the prime mover with the minimum load, the one or more current operation parameters indicative of a present condition of the system;
  retrieve one or more predetermined standard parameters from the system, the one or more predetermined standard parameters indicative of a previous condition of the system;
  compare the one or more current operation parameters with the one or more predetermined standard parameters;
  retrieve one or more predetermined standard thresholds from the system, the one or more predetermined standard thresholds indicative of a previous operating capability of the prime mover;
  calculate one or more optimal operation thresholds based on the one or more predetermined standard thresholds and the comparison of the one or more current operation parameters with the one or more predetermined standard parameters, the one or more optimal operation thresholds indicative of a present operating capability of the prime mover;
  add an actual load to the prime mover; and
  operate the prime mover with the actual load using the one or more optimal operation thresholds.

2. The system of claim 1, wherein the TRS controller is configured to monitor an operation parameter and determining whether the one or more optimal operation thresholds are reached, and adjust a prime mover speed when the one or more optimal operation thresholds are reached.

3. The system of claim 1, wherein the one or more current operation parameters include one or more of a prime mover output, a prime mover fuel consumption, an amount of fuel delivered to the prime mover, an exhaust gas temperature, a prime mover oil temperature, an air intake flow speed, a piston position, and a noise level.

4. The system of claim 1, wherein the minimum load is ~5%-~15% of the full load on the prime mover.

5. The system of claim 1, wherein the one or more optimal operation thresholds include an up-shift point, and
 wherein the TRS controller is configured to instruct the prime mover to switch from a second speed to a first speed when the up-shift point is reached.

6. The system of claim 1, wherein the one or more optimal operation thresholds include a down-shift point, and
 wherein the TRS controller is configured to instruct the prime mover to switch from a first speed to a second speed when the down-shift point is reached.

7. The system of claim 1, wherein the one or more optimal operation thresholds include a maximum load point, and
 wherein the TRS controller is configured to instruct the prime mover to shed load when the maximum load point is reached.

8. The system of claim 1, further comprising an electronic control unit (ECU), wherein the ECU obtains the one or more current operation parameters of the system from the one of more sensors and transmits the one or more current operation parameters to the TRS controller.

9. A method of operating a prime mover for use in a system, comprising:
- starting the prime mover;
- operating the prime mover with a minimum load, the minimum load being less than a full load on the prime mover;
- obtaining one or more current operation parameters of the system from one of more sensors when operating the prime mover with the minimum load, the one or more current operation parameters indicative of a present condition of the system;
- retrieving one or more predetermined standard parameters from the system, the one or more predetermined standard parameters indicative of a previous condition of the system;
- comparing the one or more current operation parameters with the one or more predetermined standard parameters;
- retrieving one or more predetermined standard thresholds from the system, the one or more predetermined standard thresholds indicative of a previous operating capability of the prime mover;
- calculating one or more optimal operation thresholds based on the one or more predetermined standard thresholds and the comparison of the one or more current operation parameters with the one or more predetermined standard parameters, the one or more optimal operation thresholds indicative of a present operating capability of the prime mover;
- adding an actual load to the prime mover; and
- operating the prime mover with the actual load using the one or more optimal operation thresholds.

10. The method of claim 9, further comprising:
- monitoring an operation parameter and determining whether the one or more optimal operation thresholds are reached; and
- adjusting a prime mover speed when the one or more optimal operation thresholds are reached.

11. The method of claim 9, wherein the one or more current operation parameters include one or more of a prime mover output, a prime mover fuel consumption, an amount of fuel delivered to the prime mover, an exhaust gas temperature, a prime mover oil temperature, an air intake flow speed, a piston position, and a noise level.

12. The method of claim 9, wherein the minimum load is ~5%-~15% of the full load on the prime mover.

13. The method of claim 9, wherein the one or more optimal operation thresholds include an up-shift point, and the method further including a controller instructing the prime mover to switch from a second speed to a first speed when the up-shift point is reached.

14. The method of claim 9, wherein the one or more optimal operation thresholds include a down-shift point, and the method further including a controller instructing the prime mover to switch from a first speed to a second speed when the down-shift point is reached.

15. The method of claim 9, wherein the one or more optimal operation thresholds include a maximum load point, and
- the method including a controller instructing the prime mover to shed load when the maximum load point is reached.

16. The method of claim 9, wherein the one or more current operation parameters indicative of one or more of a prime mover age, a prime mover fuel temperature, a prime mover fuel quality and an oxygen content of air surrounding the prime mover.

17. The method of claim 9, wherein the prime mover is started at a low speed.

18. A load control method by using a transport refrigeration system (TRS) controller, comprising:
- starting a prime mover of a TRS;
- operating the prime mover with a minimum load, the minimum load being less than a full load on the prime mover;
- obtaining one or more current operation parameters of the system from one of more sensors when operating the prime mover with the minimum load, the one or more current operation parameters indicative of a present condition of the system;
- retrieving one or more predetermined standard parameters from the system, the one or more predetermined standard parameters indicative of a previous condition of the system;
- comparing the one or more current operation parameters with the one or more predetermined standard parameters;
- retrieving one or more predetermined standard thresholds from the system, the one or more predetermined standard thresholds indicative of a previous operating capability of the prime mover;
- calculating one or more optimal operation thresholds based on the one or more predetermined standard thresholds and the comparison of the one or more current operation parameters with the one or more predetermined standard parameters, the one or more optimal operation thresholds indicative of a present operating capability of the prime mover;
- adding an actual load to the prime mover; and
- operating the prime mover with the actual load using the one or more optimal operation thresholds.

19. The method of claim 18, further comprising:
- monitoring an operation parameter and determining whether the one or more optimal operation thresholds are reached; and
- when the one or more optimal operation thresholds are reached, changing a prime mover speed.

* * * * *